(12) United States Patent
Byun (10) Patent No.: US 6,774,311 B1
(45) Date of Patent: Aug. 10, 2004

(54) MULTIPLE CHANNEL DUCT ASSEMBLY FOR CABLES

(75) Inventor: Moo-Won Byun, Seoul (KR)

(73) Assignee: Optiroad, Inc., Seoul (KR)

( * ) Notice: Subject to any disclaimer, the term of this patent is extended or adjusted under 35 U.S.C. 154(b) by 0 days.

(21) Appl. No.: 10/019,611

(22) PCT Filed: May 13, 2000

(86) PCT No.: PCT/KR00/00457

§ 371 (c)(1), (2), (4) Date: Dec. 28, 2001

(87) PCT Pub. No.: WO01/01535

PCT Pub. Date: Jan. 4, 2001

(30) Foreign Application Priority Data

Jun. 30, 1999 (KR) .......................................... 1999-26147
Nov. 1, 1999 (KR) .......................................... 1999-47976

(51) Int. Cl.[7] ................................................ H02G 3/04

(52) U.S. Cl. ........................... 174/95; 174/48; 138/115; 52/220.7

(58) Field of Search ........................... 174/48, 57, 68.3, 174/72 A, 47, 24, 95, 102 D; 138/121, 155, 115, 111, 112, 120; 52/220.7; 439/207; 285/133.03, 157.11

(56) References Cited

U.S. PATENT DOCUMENTS

| | | | | | |
|---|---|---|---|---|---|
| 3,992,565 A | * | 11/1976 | Gatfield | ..................... | 174/47 X |
| 4,705,914 A | * | 11/1987 | Bondon | ....................... | 174/28 |
| 4,741,593 A | * | 5/1988 | Fochler | .................. | 138/111 X |
| 4,889,298 A | * | 12/1989 | Hauff | ....................... | 174/48 X |
| 5,236,016 A | * | 8/1993 | Vogolsang | ................ | 174/95 X |
| 5,463,187 A | * | 10/1995 | Battle | ....................... | 174/88 R |
| 5,692,545 A | | 12/1997 | Rodrigue | .................... | 138/115 |

FOREIGN PATENT DOCUMENTS

| | | |
|---|---|---|
| EP | 893722 | 1/1999 |
| GB | 1458531 | 12/1976 |

* cited by examiner

Primary Examiner—Dhiru R Patel
(74) Attorney, Agent, or Firm—Madson & Metcalf (57) ABSTRACT

The multiple channel duct assembly for cables includes a plurality of plastic inner ducts (10) contiguous, co-directionally extending, substantially parallel, and in abutting contact with each other. Each of the inner ducts (10) has a cross sectional area sufficient to contain at least one cable. A plastic outer duct (20) encircles the inner ducts over their entire length to retain them in their contiguous relationship. The outer duct (20) has a corrugated tubular section including a plurality of contiguous ridges (21) and troughs (22) extending over their entire length. The assembly is sufficiently flexible that it can be coiled around transportable reels as well as sufficiently strong that it can withstand dirt in a trench.

20 Claims, 6 Drawing Sheets

MULTIPLE CHANNEL DUCT ASSEMBLY FOR CABLES

BACKGROUND OF THE INVENTION

I. Field of the Invention

This invention relates to a duct that is provided for containing long runs of optical fibers, electric wires or the likes disposed in underground networks. More particularly, the invention relates to a multiple channel duct assembly which includes a plurality of contiguous ducts adapted for the containment of lengthy runs of for optical fibers, electric wires or the likes.

II. Description of the Prior Art

In the ground network industry, the proper design and installation of fiber optic cables or electric wires is critical to maintaining the integrity of the information or the electric energy carried by such cables.

Due to the delicate nature of the optic fibers or electric wires themselves, there is a need to protect the fibers or the electric wires from external sources of stress, such as temperature, pressure and contact with contaminating substances. As a result, most of the innovation in this industry has been directed to devising certain combinations of coverings to surround the optical fibers or electric wires. Therefore, a brief discussion of a method of installing fiber optic cable follows.

A multiple channel duct disclosed in U.S. Pat. No. 4,741,593, comprises a plurality of corrugated inner ducts contiguous, co-directionally extending, substantially parallel, in abutting contact with each other, each of said inner duct having a series of encircling contiguous convolutions extending over the length, being made up of contiguous ridges and troughs; and a flexible, synthetic resin overwrap sheath consisting of a sheath of rigid polyvinylchloride having a thickness of about 5 mils to about 15 mils, said sheath of rigid polyvinylchloride encircling and jacketing the corrugated inner ducts over their entire length to retain them in their contiguous relationship.

The above mentioned reference says that this type of multiple channel duct is flexible and can be coiled around relatively large reels. A great length of said multiple channel duct be coiled on the reel for lay out into an underground communications pipe, or can be reeled into a trench for direct burial. This type of multiple channel duct allows an overall reduction in fiber optic cable installation costs, and the manifolding aspect of the system maintains high structural integrity over the entire length of the conduit sections, and affords enhanced moisture protection to the entire system by reason of the overwrap employed. These advantages are the most desirable attributes in the cable duct for optical fibers, electric wires or the likes.

However, I have not found this type of multiple channel duct is sold in real cable duct market until now. The reason, I believe, is why this type of multiple channel duct has critical deficiencies in strength or flexibility in reality, which have not been found by the inventor at first. It is well known fact that although the inner duct of plastic with relatively small diameter, even though non-corrugated, is so flexible that it can be coiled around transportable reels, the non-corrugated outer duct of plastic with relatively large diameter is not so flexible that it can not be coiled around transportable reels.

The above-mentioned multiple channel duct include a plurality of corrugated inner ducts of plastic and a non-corrugated outer duct of plastic. Therefore, it is easily understood that the above-mentioned multiple channel duct is not so flexible that it can not be coiled around transportable reels. I believe that this deficiency is one of the reasons why this type of multiple channel duct can not be founded in real cable market.

A current method of installing fiber optic cables is disclosed in U.S. Pat. No. 5,027,864. That reference involves the use of a hollow outer duct, typically constructed of polyvinylchloride (PVC) in forty foot lengths, which provides the first level of protection from the elements underground. This outer duct acts as a conduit for the passage of a number of smaller tubes, or "inner ducts" typically constructed of polyethylene in continuously long run lengths, which provides the second level of protection from the elements underground. Each of these inner ducts has a number of external longitudinally extending ribs, and each inner duct may contain a single fiber optic cable or a plurality of such cables.

The method of installing the cables first requires the introduction of the inner ducts through the outer duct by pulling the inner ducts from a spool located on the surface. From an underground work area, a gripper is attached to one end of each inner duct, after which the inner ducts are drawn through the outer duct until they reside completely within the outer duct. Once the inner ducts are in place, the fiber optic cables are then drawn through each of the inner ducts by a pull string blown through each of the inner ducts. The resulting assembly, therefore, comprises a single fiber optic cable or a plurality of fiber optic cables within each of several inner ducts, with the inner ducts being surrounded by the protective outer duct. The ribbed design of the inner ducts is to purports to facilitate the installation and removal of cables for maintenance and repair.

While the above-described method of installation and housing of fiber optic cables does provide a certain level of convenience for maintenance and construction workers, as well as protection for the cables themselves, several deficiencies are apparent.

First, the material used for fabrication of the outer ducts, i.e. PVC, does not afford the flexibility for use with spools in lengths greater than forty feet. Thus, the labor costs in connecting segments of outer duct every forty feet adds a tremendous cost element to the overall project budget. Second, each outer duct connection site adds a point of structural weakness to the series of segments, as well as a site of possible contaminant infiltration from underground sources.

Further, the insertion of the inner ducts through the outer duct imposes a substantial increase in installation costs, in terms of labor. The other type of multiple channel duct is disclosed in U.S. Pat. No. 5,692,545. That reference involves a cable duct for protecting communication cable comprising an elongated body portion having a first end and a second end, the body portion further including a longitudinal axis extending between the first end and the second end; and at least two passageways formed completely through the body portion and extending substantially parallel to the longitudinal axis, each of the passageways having a cross sectional area sufficient to loosely contain at least one communication cable; wherein said body portion is constructed from a combination of materials including plastic and crumb rubber.

This type of multiple channel duct eliminates the inner ducts altogether, allowing extrusion of a duct to much greater lengths, and installation of such ducts from spools.

Therefore this type of duct also has advantages in minimizing the number of connections required between segments of the duct and other protective attributes of the duct and increase the data transmission integrity of the cables themselves.

However, this type of duct has deficiencies inherent in construction from a combination of materials including plastic and crumb rubber. As described in the specification of said reference, if greater rigidity in said duct is required, a greater percentage of plastic may be added. Conversely, if greater flexibility is desired, a greater percentage of crumb rubber would likely provide the necessary flexion.

Therefore, it is difficult to meet the strict needs of greater strength and greater flexibility at the same time in this type of multiple channel duct. Besides, it is easily foreseen that this type of multiple channel duct with greater percentage of crumb rubber will have passageways with less smoothness on their inside surfaces. These might be critical deficiencies in the field of cable ducts, through which fiber optic cables, electric wires or the like are inserted.

SUMMARY OF THE INVENTION

It is an object of this invention to provide a multiple channel duct assembly which enables quicker installation of fiber optic cables, electric wires or the likes thus reducing labor and material costs substantially over the prior art.

It is another object of this invention to provide a multiple channel duct assembly which reduces the number of connections required between the duct segments themselves and has greater strength as well as greater flexibility at the same time.

It is still another object of this invention to provide a multiple channel duct assembly which has inner ducts with sufficiently smooth inside surfaces.

The multiple channel duct assembly for cables in accordance with the present invention comprises (a) a plurality of plastic inner ducts contiguous, co-directionally extending, substantially parallel, in abutting contact with each other, each of said inner ducts having the cross sectional areas sufficient to contain at least one cable; and (b) a plastic outer duct encircling said inner ducts over their entire length to retain them in their contiguous relationship; (c) wherein said outer duct has a corrugated tubular section including a plurality of contiguous ridges and troughs extending over the entire length; (d) whereby said assembly is so flexible that it can be coiled around transportable reels as well as so strong that it can withstand dirt in a trench.

The multiple channel duct assembly can be extruded incessantly to much greater lengths, being coiled around transportable reels. A great length of said multiple channel duct assembly be coiled on the reel for lay out into an underground communications pipe, or can be reeled 15 into a trench for direct burial.

This duct assembly allows an overall reduction in cable installation costs, and the manifolding aspect of the present invention maintains high structural integrity over the entire length of the conduit sections, and affords enhanced moisture protection to the entire system by reason of the outer duct which is corrugated and incessantly extended. Besides, the aspect of inner ducts of plastic with less friction provides sufficiently smooth inside surfaces to the inner ducts, through which fiber optic cables, electric wires or the likes are inserted.

BEST MODE FOR CARRYING OUT THE INVENTION

These and other objects and advantages of the present invention will no doubt become apparent to those skilled in the art after having read the following description of the embodiments which are contained in and illustrated by the various drawing figures.

A particular method and apparatus is necessary for producing the duct assembly in accordance with the present invention. The apparatus for producing the duct assembly and the method in accordance with the present invention is also distinguished from prior arts, thus being applied for patent separately from this invention.

Therefore, the detailed description on the apparatus and method of producing the duct assembly in accordance with the present invention is omitted at this specification and drawings.

Figure 1:
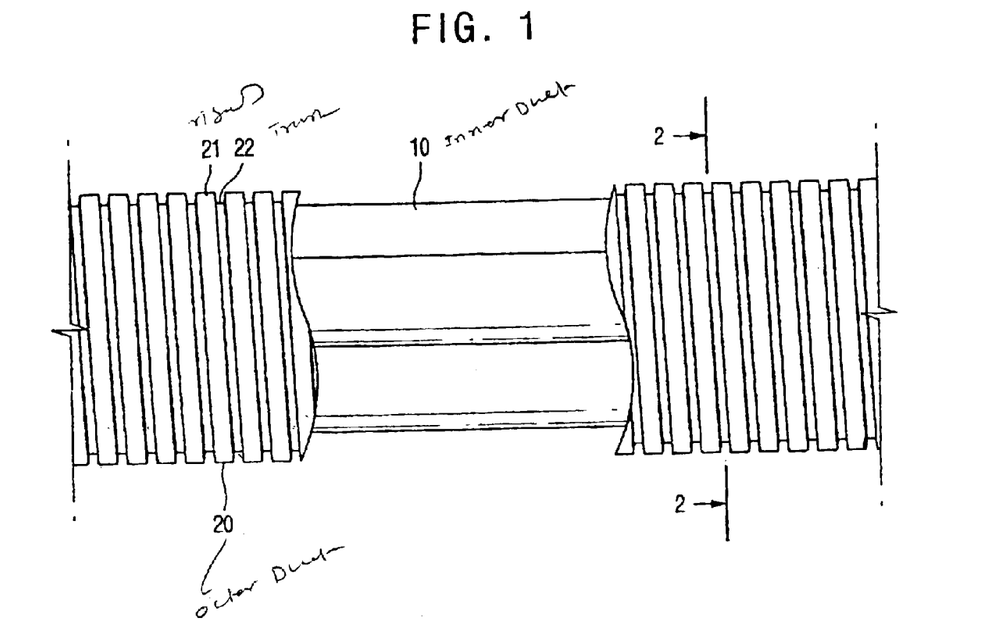
FIG. 1 is a front elevational view of the multiple channel duct assembly of the invention depicting a typical assembly containing five inner ducts within a corrugated outer duct. A portion of the corrugated outer duct has been broken away to show the inner ducts within the corrugated outer duct.
Figure 2:
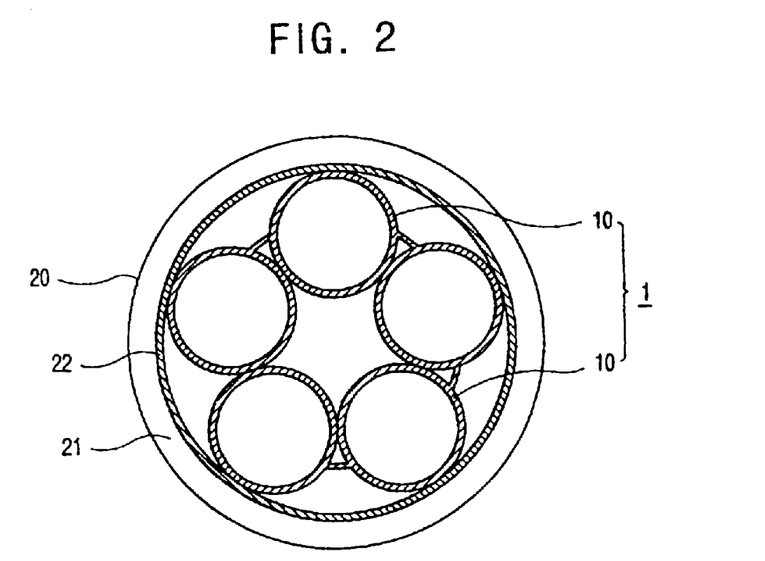
FIG. 2 is a sectional view taken along the line 2—2 of FIG. 1.

As shown FIGS. 1 and 2, a preferred embodiment of the multiple channel duct assembly comprises a plurality of elongated inner ducts 10 of plastic, which are extended in abutting contact with each other; and an outer duct 20 of plastic, which encircles the inner ducts 10 over their entire length to retain them in its contiguous relationship, with a corrugated tubular section.

The inner ducts 10 are extended co-directionally, substantially parallel, in abutting contact with each other, and have the cross sectional areas sufficient to contain at least one optical fiber cable or electric wire.

Figure 3:
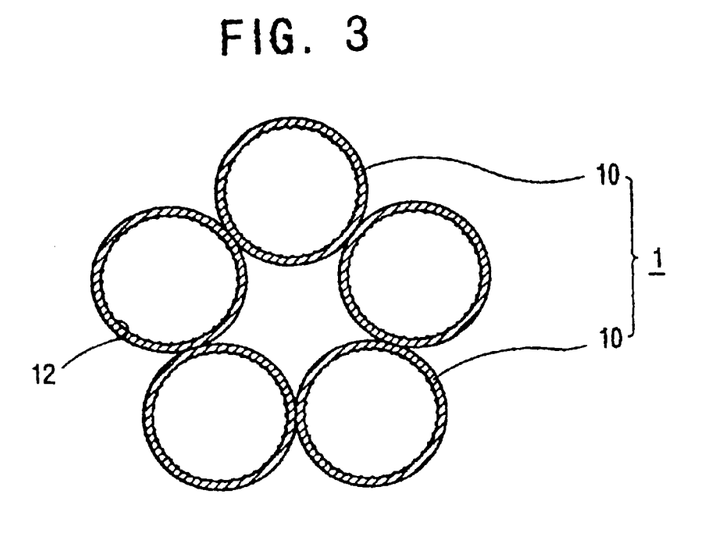
FIG. 3 is a cross sectional view of a bundle of inner ducts formed by assembling separately extruded inner ducts.
Figure 4:
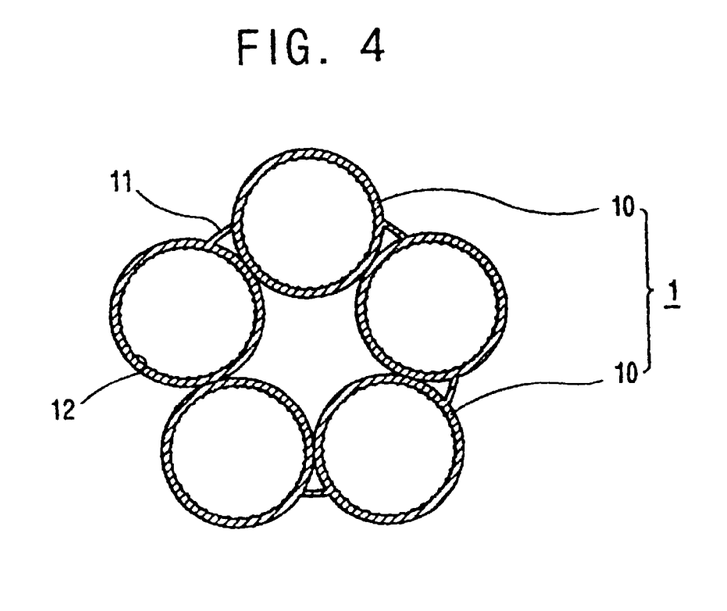
FIG. 4 is a cross sectional view of a bundle of inner ducts formed by folding inner ducts with flexible connecting webs.

The inner ducts 10 are assembled to form a tube bundle 1. The tube bundle 1 may be formed by assembling separately extruded inner ducts 10 as shown FIG. 3, or by folding inner ducts 10 with flexible connecting webs 11, as shown FIG. 4. The tube bundle 1 can have various cross sectional shapes according to the number of the inner ducts 10 and cross sectional shapes of the outer duct 20.

Although in the preferred embodiment, the inner ducts 10 are circular in cross sections, it is to be understood that each of inner ducts 10 may take any desired shape such as round, ellipsoid, square or any other cross-sectional shape required for its final use.

The inner ducts 10 can be made of polyethylene, polypropylene, or any other thermoplastic resin. However, it is preferable that each of inner ducts 10 is made of polyethylene, which is more flexible and exhibits less sliding friction than any other plastics. To reduce further the friction between the inner ducts 10 and fiber-optic cable as the cable is drawn through the system, the interior surfaces of the inner ducts 10 can be formed with longitudinal, or spiral ridges 12 upon which the cable ride as it pulled through the inner ducts as shown FIG. 2. Alternately, the wall of the inner duct can be formed with corrugation.

The outer duct 20, which includes the corrugated tubular section having a plurality of ridges 21 and troughs 22 extending over the entire length, encircles the inner ducts over their entire length to retain them. It is important that the troughs 22 of the outer duct 20 are in contiguous relationship with the inner ducts 10 as shown FIG. 2. It is preferable that the outer duct 20 and the inner ducts 10 are welded together at the contiguous portions where the troughs of the outer duct and the inner ducts are contacted.

Although the preferred configuration of the outer duct is regular, precisely circular corrugations, helical corrugations can also be utilized. The outer duct also can be made of polyethylene, polypropylene, any other thermoplastic resin. However, the most preferable material of the outer duct is polyethylene, which is the same as the inner ducts.

The present invention resides in that a plurality of inner ducts 10 are extended contiguous, co-directionally, substantially parallel, in abutting contact with each other, and a corrugated outer duct 20 encircles said inner ducts 10 over their entire length to retain them in contiguous relationship with them. The multiple channel duct assembly in accordance with the present invention is so flexible that it can be coiled around transportable reels, because an outer duct 20 of plastic with relatively large diameter has corrugated tubular section. An embodiment of FIGS. 1 and 2 depict a multiple channel duct assembly in accordance with the present invention, which has been manufactured in my factory.

Five inner ducts 10 which are extending in substantially parallel, in contiguous abutting relationship with each other, along their longitudinal axes, are held by a corrugated tubular outer duct. Each of the inner ducts 10 is connected by flexible webs 11. The outer duct 20 is helically corrugated.

The corrugations of the outer duct 20 include contiguous alternating ridges 21 and troughs 22 extending along the length of the outer duct, thus providing with greater flexibility and greater strength at the same time so that the multiple channeled duct assembly can be bent through a relatively small radius without fracture.

In this embodiment, both the outer duct 20 and the inner ducts 10 have been made of polyethylene, the same material. The inner ducts 10, having longitudinally straight tubular sections, are connected by flexible webs 11 and folded to form a tube bundle in abutting contact with each other. The interior surfaces of the inner ducts 10 are formed with longitudinal ridges 12.

The outer duct 20 and the inner ducts 10 are welded together at the contiguous portions where the troughs of the outer duct and the outer surfaces of the inner ducts are contacted. The detailed advantages of the embodiment in accordance with the present invention are described below.

Figure 5:
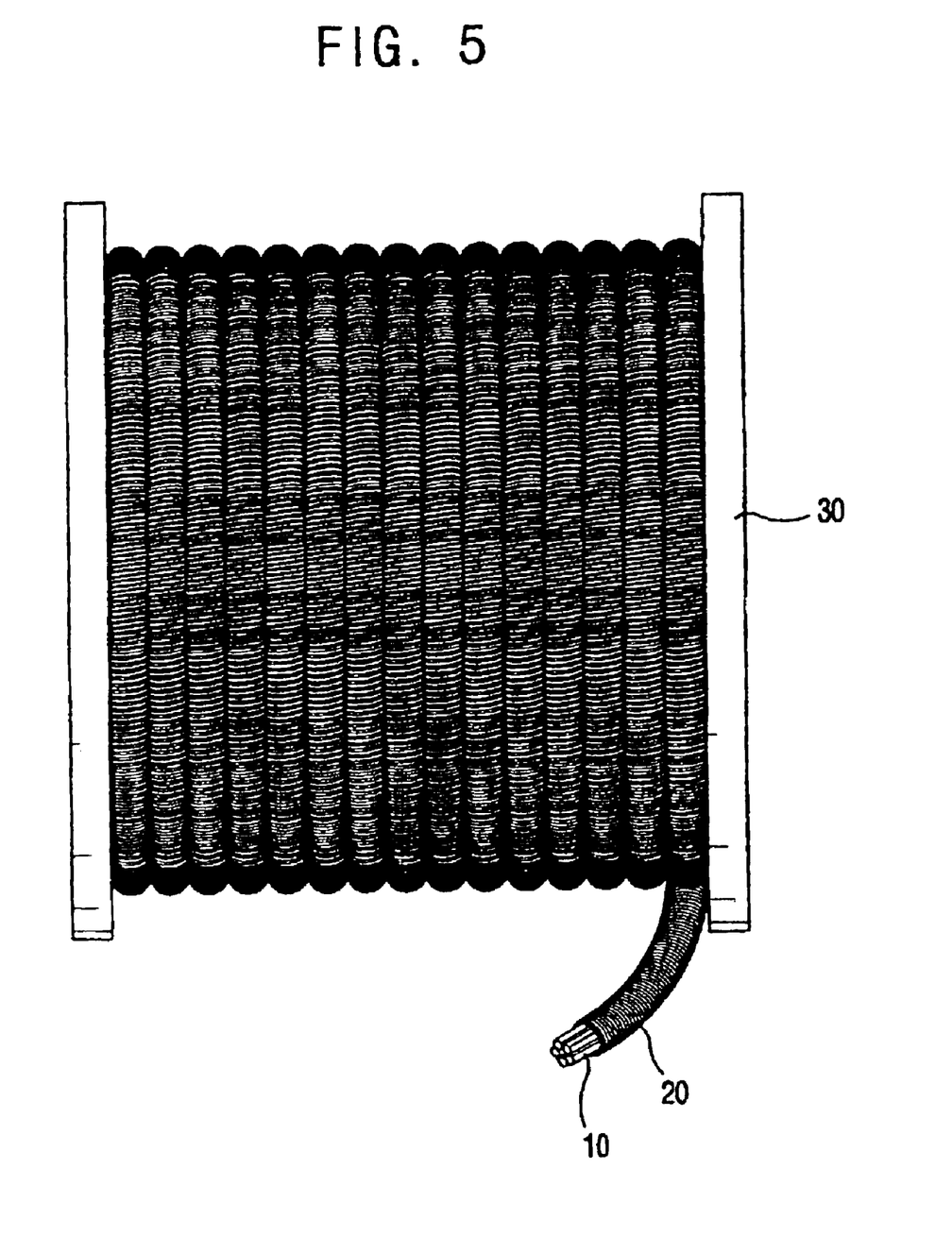
FIG. 5 is a view in elevation illustrating the manner in which multiple channel duct assemblies in accordance with the invention are reeled upon a storage reel ready to be laid out for typical installation in an underground location.

First, the embodiment in accordance with the present invention is amazingly flexible and can be coiled around the reel 30 with only two meters in diameter as shown in FIG. 5. The multiple channel duct assembly of the present invention can be continuously extruded in lengths of more than one kilometer, depending upon the need of job sites for installing optic cables or electric wires. The benefits of achieving these substantially greater lengths are: (1) less connections between cables and cable duct, (2) longer life and greater reliability of the cables, and (3) faster installation and maintenance of both cables and cable duct.

Second, the embodiment in accordance with the present invention, has straight tubular sectional inner ducts 10 which are assembled in abutting contact with each other, and a corrugated outer duct 20 which encircles the inner ducts over their entire length to retain them in its contiguous relationship. This whole configuration provides superior crushing resistance to withstand the weight of dirt filled in a trench while simultaneously allowing the present invention to flex and bend about an arc as small as five feet radius.

Third, since the inner ducts 10 of polyethylene which have longitudinal ridges 12 on their inside surfaces and less connections, provides a low friction surface, thus fiber optic cables, electric wires or the likes are easily inserted through them.

Fourth, since both the outer duct and the inner ducts are not only made of the same material but also welded together at their contiguous portions, even though the temperature of the inner ducts and the outer duct change at job sites, the inner ducts will not move longitudinally with respect to the outer duct.

Figure 6:
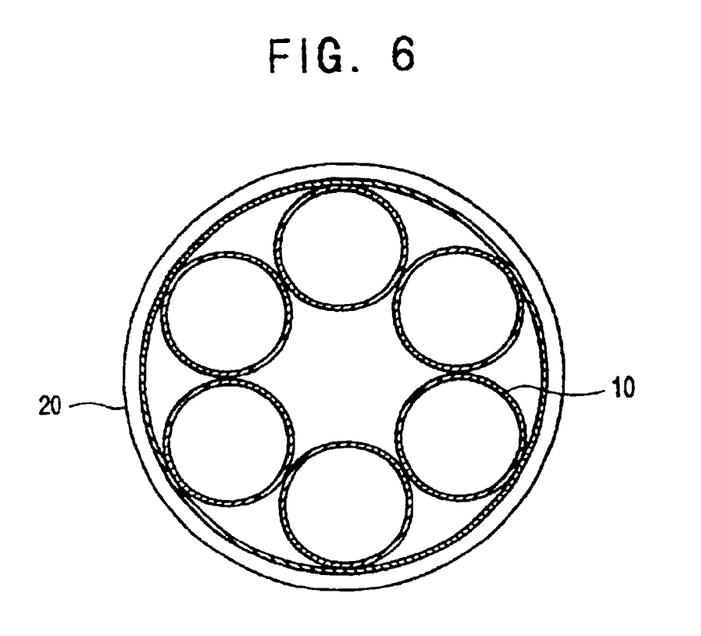
FIGS. 6 and 7 are the cross sectional views of other embodiments of the invention depicting duct assembly including a plurality of inner ducts with straight tubular sections within a corrugated outer duct with round cross section.
Figure 7:
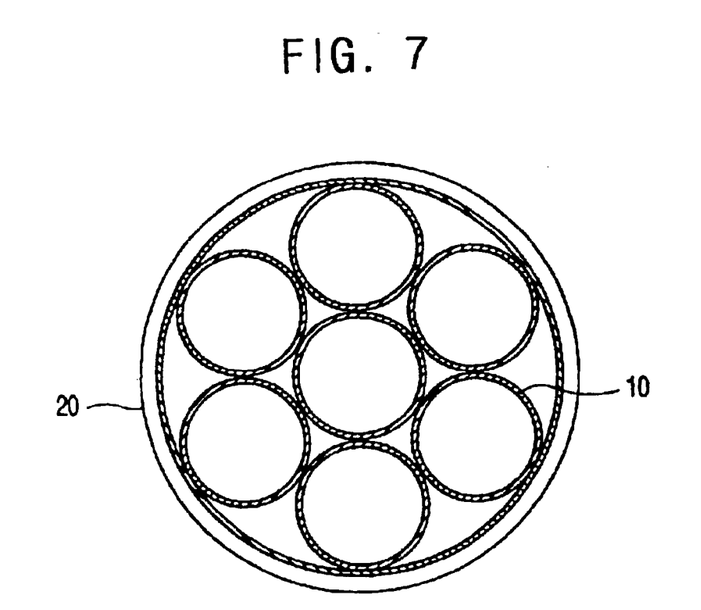

Although the preferred embodiments, as shown FIGS. 6 and 7, have a corrugated outer duct with a round cross sectional shape, FIGS. 8~11 depict non-round cross sectional shapes which can be employed in the special cases in any other environment where non-round cross sectional shapes are advantageous. Of course, a wide variety of alternative shapes could be also used, depending upon arrangement of inner ducts required for a particular cable installation. Various embodiments in accordance with the present invention are briefly described below.

Figure 8:
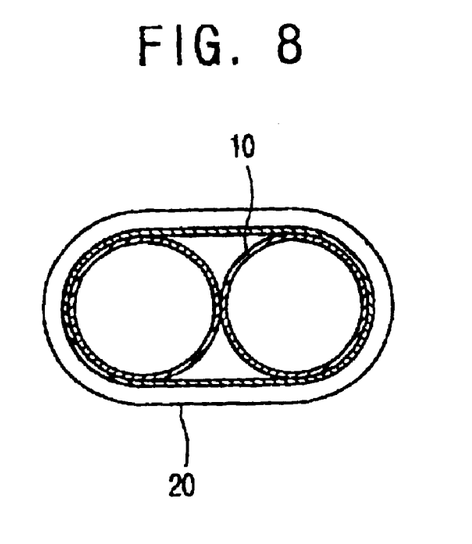
FIGS. 8, 9 and 10 are the cross sectional views of other embodiments of the invention depicting duct assembly including a plurality of inner ducts with straight tubular sections within a corrugated outer duct with non-round cross section.

FIG. 8 shows a multiple channel duct assembly which includes two straight tubular inner ducts 10 with round cross sectional shape, and an corrugated outer duct 20 with ellipsoid cross-sectional shape.

Figure 9:
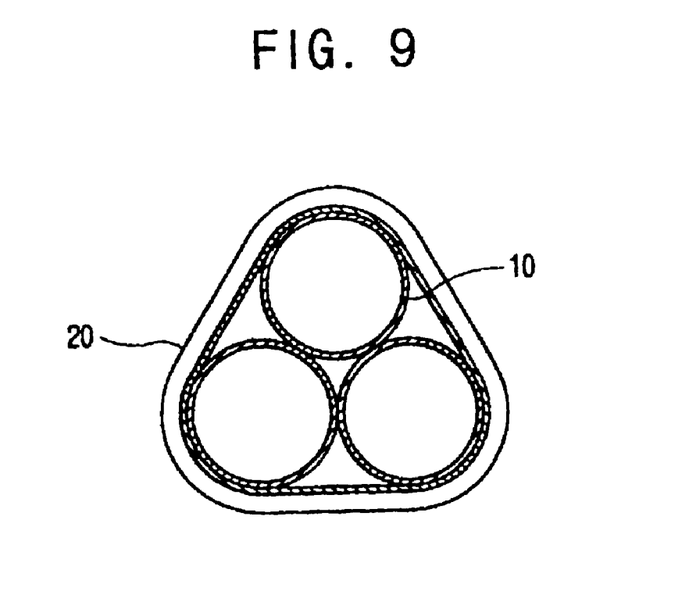

FIG. 9 shows a multiple channel duct assembly which includes three straight tubular inner ducts 10 with round cross sectional shape, and an corrugated outer duct 20 with triangular cross sectional shape with round corners.

Figure 10:
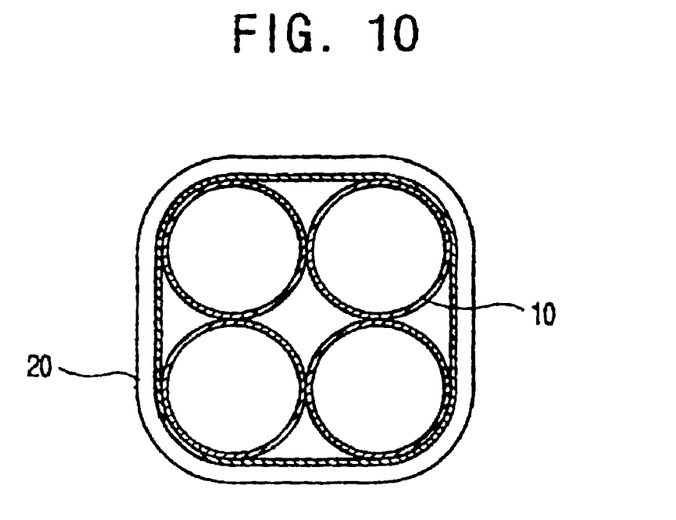

FIG. 10 shows a multiple channel duct assembly which includes four straight tubular inner ducts 10 with round cross sectional shape, and a corrugated outer duct 20 with quadrangular cross sectional shape with round corners.

Figure 11:
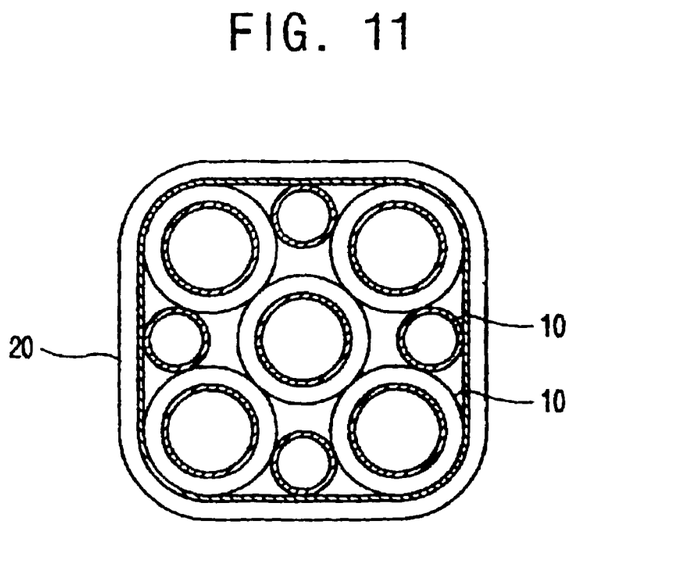
FIG. 11 is the cross sectional view of other embodiments of the invention depicting duct assembly including a plurality of inner ducts with straight tubular sections and a plurality of inner ducts with corrugated tubular sections within a corrugated outer duct with non-round cross section.

FIG. 11 shows a multiple channel duct assembly which includes four straight tubular inner ducts and five corrugated inner ducts, and a corrugated outer duct 20 with quadrangular cross-sectional shape with round corners.

Although the present invention has been described in terms of specific embodiments, it is anticipated that alterations and modifications thereof will no doubt become apparent to those skilled in the art. It is therefore intended that the following claims be interpreted as covering all such alterations and modifications which fall within the true spirit and scope of the invention.

What is claimed is:

1. A multiple channel duct assembly for cables comprising:
   (a) a plurality of plastic inner ducts contiguous, co-directionally extending, substantially parallel, in abutting contact with each other, each of said inner ducts having a cross sectional area sufficient to contain at least one cable;
   (b) a plastic outer duct encircling said inner ducts over their entire length to retain them in their contiguous relationship;
   (c) wherein said outer duct has a corrugated tubular section including a plurality of contiguous ridges and troughs extending over the entire length, wherein the troughs are in contiguous relationship with outer peripheral surfaces of the inner ducts; and
   (d) whereby said assembly is sufficiently flexible to be coiled around transportable reels as well as sufficiently strong to withstand dirt in a trench.

2. The multiple channel duct assembly for cables of claim 1, wherein each of said inner ducts is made of polyethylene.

3. The multiple channel duct assembly for cables of claim 1, wherein each of said inner ducts has a substantially round cross sectional shape.

4. The multiple channel duct assembly for cables of claim 1, wherein each of said inner ducts is made separately extruded.

5. The multiple channel duct assembly for cables of claim 1, wherein each of said inner ducts is connected by flexible connecting webs.

6. The multiple channel duct assembly for cables of claim 1, wherein said outer duct has a substantially round cross sectional shape.

7. The multiple channel duct assembly for cables of claim 1, wherein said outer duct has a substantially ellipsoid cross sectional shape.

8. The multiple channel duct assembly for cables of claim 1, wherein said outer duct has a substantially triangular cross sectional shape with round corners.

9. The multiple channel duct assembly for cables of claim 1, wherein said outer duct has a substantially quadrangular cross sectional shape with round corners.

10. A multiple channel duct assembly for cables comprising:
    (a) a plurality of plastic inner ducts contiguous, co-directionally extending, substantially parallel, in abutting contact with each other, each of said inner ducts having a cross sectional area sufficient to contain at least one cable;
    (b) a plastic outer duct encircling said inner ducts over their entire length to retain them in their contiguous relationship;
    (c) wherein said outer duct has a corrugated tubular section including a plurality of contiguous ridges and troughs extending over the entire length, wherein the troughs are in contiguous relationship with outer peripheral surfaces of the inner ducts, and wherein said inner ducts and said outer ducts are altogether made of polyethylene; and
    (d) whereby said assembly is sufficiently flexible to be coiled around transportable reels as well as sufficiently strong to withstand dirt in a trench.

11. The multiple channel duct assembly for cables of claim 10, wherein said inner ducts and said outer duct are welded together at the contiguous portions where the troughs of said outer duct and the outer peripheral surfaces of said inner ducts are contacted.

12. The multiple channel duct assembly for cables of claim 10, wherein each of said inner ducts is made separately extruded.

13. The multiple channel duct assembly for cables of claim 10, wherein each of said inner ducts is connected by flexible connecting webs.

14. The multiple channel duct assembly for cables of claim 10, wherein the interior surfaces of said inner ducts are formed with longitudinal ridges upon which the cable ride as it pulled through them.

15. The multiple channel duct assembly for cables of claim 10, wherein the interior surfaces of said inner ducts are formed with spiral ridges upon which the cable ride as it pulled through them.

16. The multiple channel duct assembly for cables of claim 10, wherein the wall of said inner ducts are formed with corrugation.

17. The multiple channel duct assembly for cables of claim 10, wherein said outer duct has a substantially round cross sectional shape.

18. The multiple channel duct assembly for cables of claim 10, wherein said outer duct has a substantially ellipsoid cross sectional shape.

19. The multiple channel duct assembly for cables of claim 10, wherein said outer duct has a substantially triangular cross sectional shape with round corners.

20. The multiple channel duct assembly for cables of claim 10, wherein said outer duct has a substantially quadrangular cross sectional shape with round corners.

* * * * *